(12) United States Patent
Sato et al.

(10) Patent No.: US 7,363,997 B2
(45) Date of Patent: Apr. 29, 2008

(54) FUEL CELL VEHICLE

(75) Inventors: Kazuhisa Sato, Saitama (JP); Yukio Hiruta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 164 days.

(21) Appl. No.: 11/288,809

(22) Filed: Nov. 28, 2005

(65) Prior Publication Data
US 2006/0113128 A1 Jun. 1, 2006

(30) Foreign Application Priority Data
Nov. 26, 2004 (JP) ............... 2004-343119

(51) Int. Cl.
*B60K 28/14* (2006.01)
(52) U.S. Cl. ............ 180/65.3; 180/282; 903/944
(58) Field of Classification Search ........... 180/277, 180/282, 284, 65.1, 65.3; 903/908, 944
See application file for complete search history.

(56) References Cited

U.S. PATENT DOCUMENTS

| | | | | |
|---|---|---|---|---|
| 3,743,849 | A * | 7/1973 | Iwata ................. | 307/10.1 |
| 5,281,780 | A * | 1/1994 | Haland ................. | 200/52 R |
| 5,389,824 | A * | 2/1995 | Moroto et al. ............ | 370/10.1 |
| 5,483,447 | A * | 1/1996 | Jeenicke et al. ........... | 701/45 |
| 5,484,166 | A * | 1/1996 | Mazur et al. ............ | 280/735 |
| 5,641,031 | A * | 6/1997 | Riemer et al. ............ | 180/65.3 |
| 5,793,005 | A * | 8/1998 | Kato ................. | 200/61.45 R |
| 5,934,703 | A * | 8/1999 | Mimura et al. ............ | 280/734 |
| 6,167,335 | A * | 12/2000 | Ide et al. ................. | 701/45 |
| 6,354,261 | B1 * | 3/2002 | Lassiter ................. | 123/198 D |
| 6,536,551 | B1 * | 3/2003 | Tanaka et al. ............ | 180/271 |
| 6,591,924 | B2 * | 7/2003 | Shimizu ................. | 180/65.1 |
| 6,644,688 | B1 * | 11/2003 | Hu et al. ................. | 280/735 |
| 7,086,492 | B2 * | 8/2006 | Kawasaki et al. ......... | 180/274 |
| 2005/0184495 | A1 * | 8/2005 | Zerbe ................. | 280/735 |

FOREIGN PATENT DOCUMENTS

| | | |
|---|---|---|
| DE | 19962680 A1 | 7/2001 |
| DE | 19963348 A1 | 7/2001 |
| DE | 10148340 A1 | 4/2003 |
| DE | 10361647 A1 | 8/2005 |
| JP | 2004-082793 | 3/2004 |
| WO | WO-01/48847 A2 | 7/2001 |

OTHER PUBLICATIONS

German Office Action for Application No. 102005056345.7-34, dated Mar. 8, 2007.
German Office Action for Application No. 102005056345.7-.34, dated Aug. 7, 2007.

* cited by examiner

*Primary Examiner*—Jeff Restifo
(74) *Attorney, Agent, or Firm*—Lahive & Cockfield, LLP; Anthony A. Laurentano

(57) ABSTRACT

The fuel cell vehicle includes a fuel cell for generating electric power by electrochemical reaction of hydrogen and oxygen, and a hydrogen tank which stores pressurized hydrogen to supply hydrogen to the fuel cell, the fuel cell and the hydrogen tank being arranged at an underfloor region of the vehicle. Based on the detection results in a side G sensor arranged on the side of the fuel cell and a rear G sensor arranged on the side of the hydrogen tank, a side air bag device is made expandable and a cut-off valve and a contactor are operated to cut off.

9 Claims, 3 Drawing Sheets

FUEL CELL VEHICLE

The present invention claims foreign priority to Japanese patent application no. 2004-343119, filed on Nov. 26, 2004, the subject matter of which is incorporated herein by reference.

BACKGROUND OF THE INVENTION

1. Field of the Invention

The present invention relates to a fuel cell vehicle, and more particularly to a fuel cell vehicle capable of protecting a fuel cell and others from shock or collision.

2. Description of the Related Art

Traditionally, a fuel cell vehicle incorporating a fuel cell is known. In such a fuel cell vehicle, when it gets a shock, a shock detecting sensor such as a G sensor detects the shock, and on the basis of a detection result, supply of hydrogen is interrupted (see Japanese Patent Unexamined Publication JP-A-2004-82793).

Meanwhile, like other types of vehicles, the fuel cell vehicle requires an air bag and other passenger protecting devices in order to protect a passenger from shock at the time of vehicle collision. Also in the case where such a passenger protecting device is provided, a G sensor is required. Therefore if G sensor employed for these passenger protecting devices is provided together with sensors peculiar to the fuel cell vehicle, an arrangement space will be limited.

In addition, the production cost will increase due to a number of sensors being provided.

SUMMARY OF THE INVENTION

In view of such a circumstance, an object of this invention is to provide a fuel cell vehicle that has less limitation to arrangement of the components so that the components can be arranged at optimum positions, thus reduces the production cost.

In order to attain the above object, according to a first aspect of the present invention, a fuel cell vehicle includes a fuel cell (e.g. a fuel cell 3 in an embodiment) for generating electric power through electrochemical reaction of hydrogen and oxygen, a hydrogen tank (e.g. hydrogen tanks 19, 20 in the embodiment) for storing pressurized hydrogen to supply hydrogen to the fuel cell, a first collision detecting sensor (e.g. side G sensors S3 in the embodiment) arranged on the side of the fuel cell, a second collision detecting sensor (e.g. rear G sensors S4 in the embodiment) arranged on the side of the hydrogen tank, and a protecting device for performing a predetermined protection operation in accordance with detection results of the first collision detecting sensor and the second collision detecting sensor.

In such a configuration, the protecting device can be operated on the basis of the detection results of the first collision detecting sensor and the second collision detecting sensor.

Therefore, in addition to the protecting operation for the passengers, the fuel cell which is one of the important components of the fuel cell vehicle and the hydrogen tank can be surly protected from collision.

According to a second aspect of the present invention, the first collision detecting sensor is located at a position corresponding to the side of a passenger in a front row (a front seat 28 in the embodiment) whereas the second collision detecting sensor is located at a position corresponding to the side of a passenger in a rear row (a rear seat 29 in the embodiment).

In such a configuration, the collision detecting sensors provided for protecting the fuel cell and the hydrogen tank can be also employed for protecting the passengers.

Therefore, a minimum number of collision detecting sensors may be employed, being located at optimum positions within a limited arrangement space, thus reducing the production cost.

According to a third aspect of the present invention, the protecting device includes a passenger protecting device (e.g. side air bag devices 37 in the embodiment) for protecting the passenger and a fuel cell protecting device (e.g. a cut-off valve 22, contactor 27 and a capacitor contactor 32) for protecting an output system and a hydrogen system of the fuel cell, and the first and the second collision sensor are given different threshold values according to respective protecting devices.

In such a configuration, while the collision detecting sensors are commonly used for both the passenger protecting device and the fuel cell protecting device, an optimum detecting accuracy can be assured according to the respective protecting devices.

Therefore, such a configuration gives the detecting performance similar to the case where collision detecting sensors are independently provided for the passenger protecting device and the fuel cell protecting device.

According to a forth aspect of the present invention, with respect to the threshold values, the threshold value set for the passenger protecting device is lower than that set for the fuel cell protecting device.

In such a configuration, protection of the passengers is given priority.

Therefore, though the collision detecting sensors are also used for the fuel cell protecting device, the collision safety performance for the passenger may be equivalent to that in an ordinary vehicle.

According to the fifth aspect of the present invention, the fuel cell protecting device cuts off at least one of the pressurized hydrogen supplied from the hydrogen tank and the output of the electric power generated by the fuel cell.

In such a configuration, at the time of collision, the hydrogen required for reaction and the generated output of the fuel cell can be surely cut off so that the hydrogen system and fuel cell system can be surely protected.

According to a sixth aspect of the present invention, the fuel cell vehicle includes an accumulating device (e.g. a capacitor 31 in the embodiment) for accumulating at least one of the electric power generated by the fuel cell and regenerative electric power generated by a drive motor driving the fuel cell vehicle, and the fuel cell protecting device cuts off an electric output from the accumulating device.

In such a configuration, at the time of collision, the output of the accumulating device as well as the generated output of the fuel cell can be surely cut off so that the fuel cell and accumulating device can be surely protected.

According to a seventh aspect of the present invention, the fuel cell and the hydrogen tank are arranged at an underfloor region of the vehicle, being disposed at the inner side of side sills (e.g. side sills 13 in the embodiment) and between left and right main frames (e.g. main frames 9 in the embodiment) extended in a longitudinal direction of the vehicle.

In such a configuration, the fuel cell and the hydrogen tank can be protected from collision at the side of the vehicle by the main frames, which is preferable in view of protecting important components.

DETAILED DESCRIPTION OF THE PREFERRED EMBODIMENT

Figure 1:
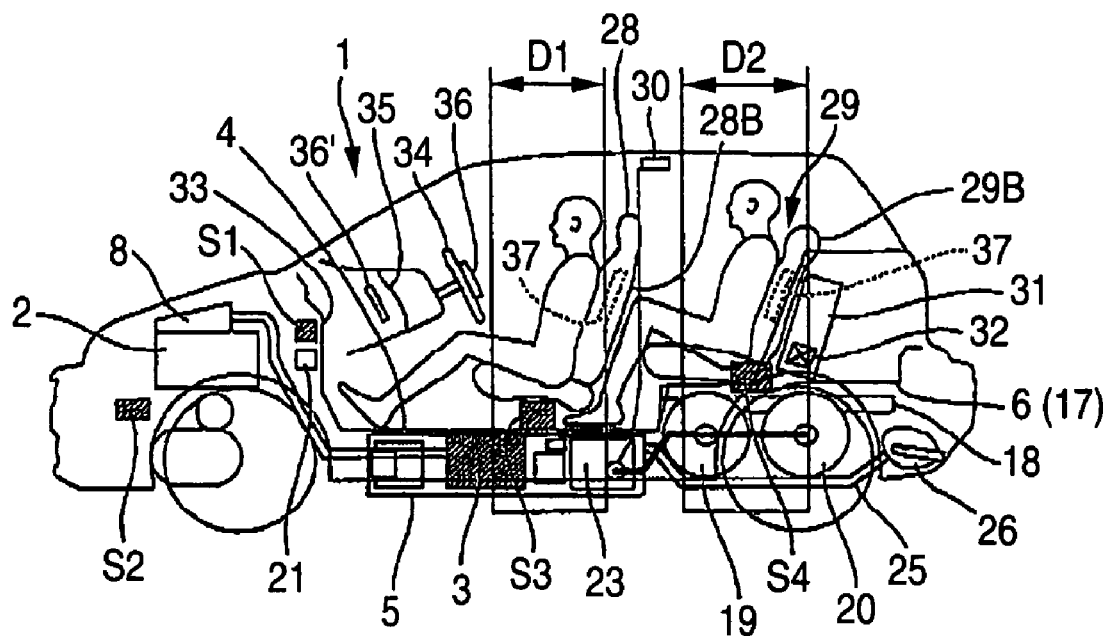
FIG. 1 is a side perspective view of the fuel cell vehicle according to an embodiment of the present invention.

Referring to the drawings, an explanation of an embodiment of the present invention will be given below.

Figure 2:
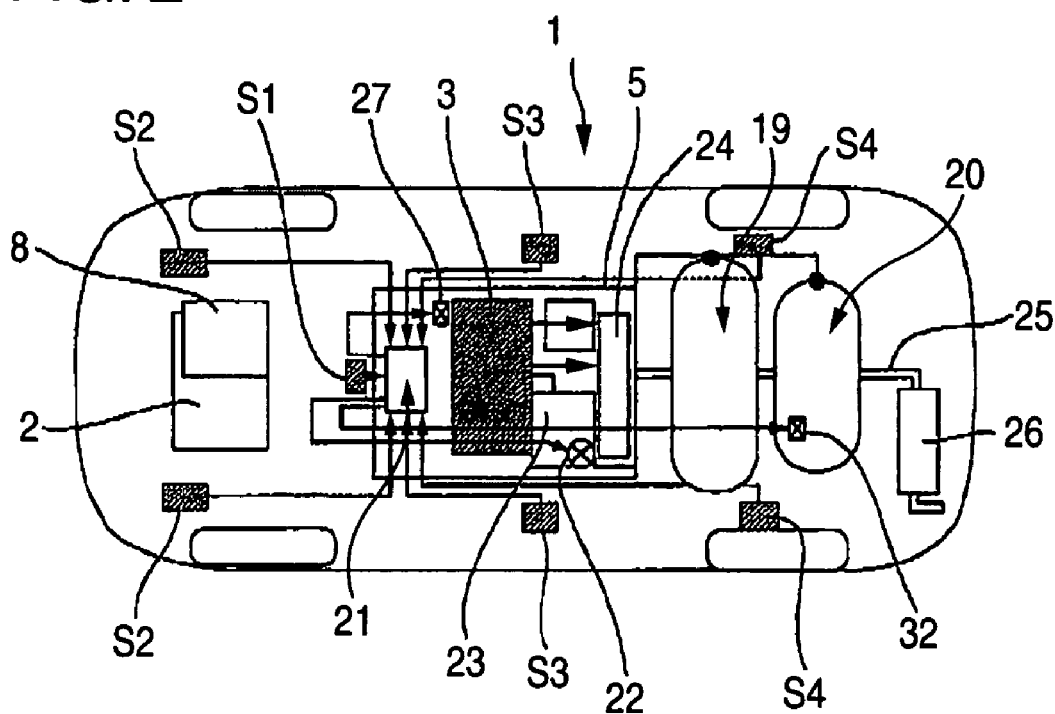
FIG. 2 is a plan perspective view of FIG. 1

As seen from FIGS. 1 and 2, a fuel cell vehicle 1 incorporates a fuel cell 3 for generating electric power through electrochemical reaction of hydrogen and oxygen. The electric power generated drives a motor 2 so that the fuel cell vehicle 1 runs. The fuel cell 3 is housed within a fuel cell system box 5 attached to the bottom of a front floor 4, i.e. an underfloor region of the vehicle. The fuel cell 3 generates electric power by the hydrogen gas and the oxygen in the air. The hydrogen gas is supplied from front and rear hydrogen tanks 19 and 20 arranged beneath a rear floor of the rear part of a vehicle body in the underfloor region of the vehicle. The oxygen in the air is supplied from a compressor 8 provided at the front of the vehicle body.

More specifically, the hydrogen gas supplied from the hydrogen tanks 19 and 20 is communicated with a hydrogen circulating system 23 within the fuel cell system box 5 via a cut-off valve (fuel cell protecting device) 22. The hydrogen circulating system 23 supplies the hydrogen gas to the fuel cell 3 and also refluxes unreacted hydrogen gas exhausted from the fuel cell 3 and recycles it. The exhausted hydrogen gas employed for power generation within the fuel cell 3 is sent to a dilution box 24 (shown in only FIG. 2) and exhausted from an exhaust pipe 25 via a silencer 26, together with the exhausted air which has been supplied from the above compressor 8 and used for power generation.

On the other hand, the output power of the fuel cell 3 is supplied to the motor 2 through a contactor (fuel cell protecting device) 27. A part of the output power is accumulated in a capacitor (accumulating device) 31 through a capacitor contactor (fuel cell protecting device) 32 arranged on the rear of a seatback 29B in a rear seat (rear row) 29. Further, during deceleration of the fuel cell vehicle 1, the regenerative electric power from the motor 2 is also accumulated in the capacitor 31. Incidentally, reference numeral 30 in FIG. 1 denotes a hydrogen sensor.

Figure 3:
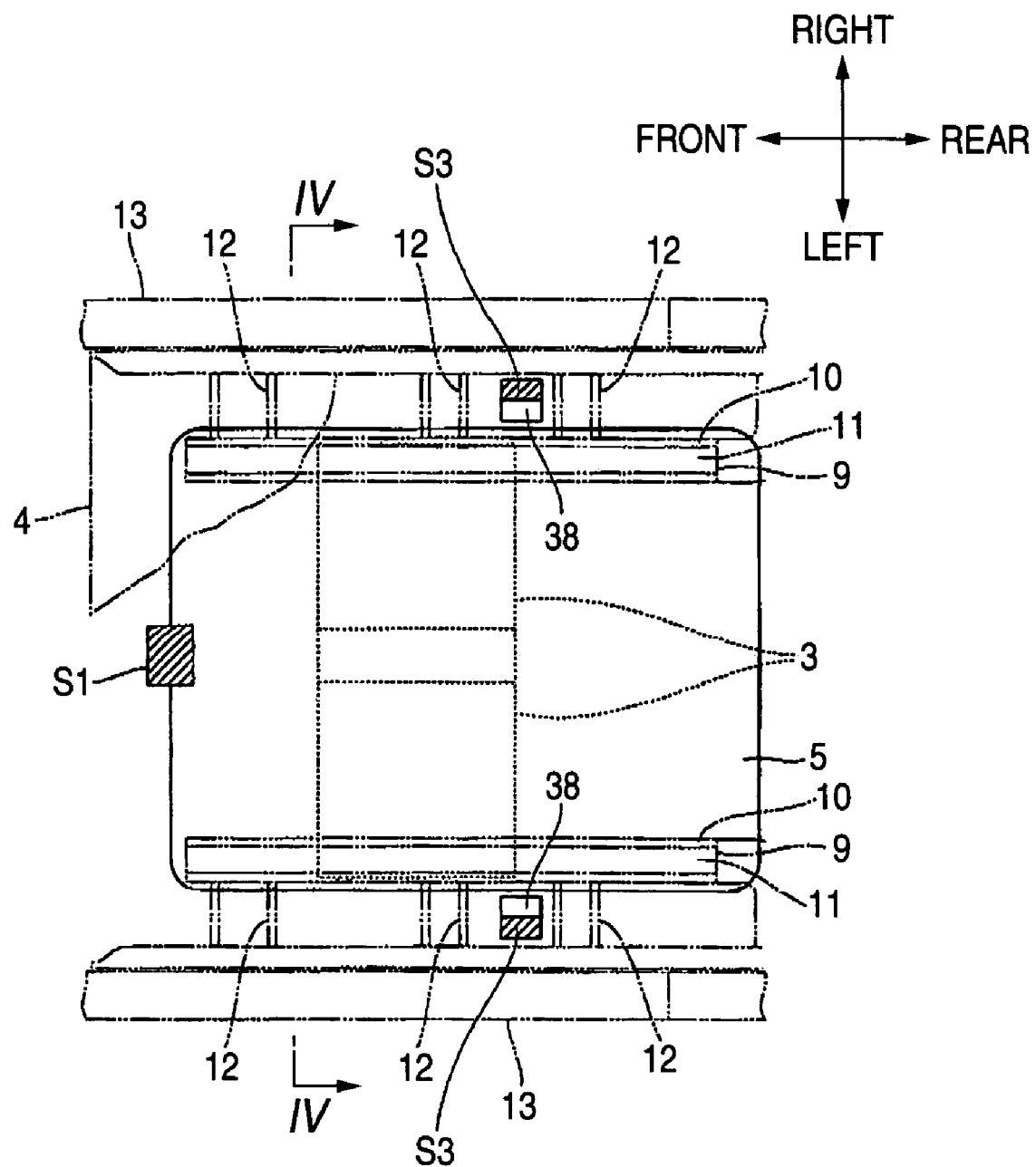
FIG. 3 is a plan view for explaining a fuel cell system box according to the embodiment of the present invention.
Figure 4:
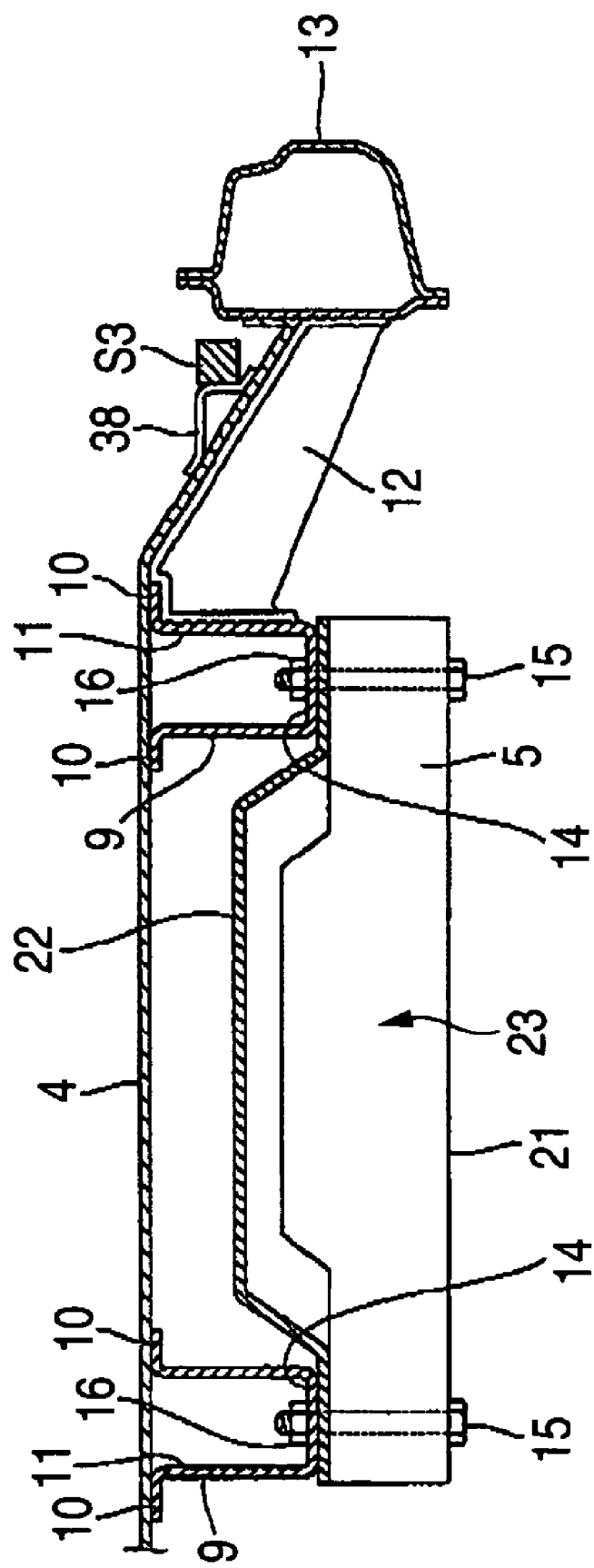
FIG. 4 is a sectional view taken along line IV-IV in FIG. 3.

As seen from FIGS. 3 and 4, the left and right sides of the lower surface of the front floor 4 are coupled with main frames 9 each having a hat-like sectional shape through flanges 10. The main frames 9 and front floor 4 constitute body frames 11 in the longitudinal direction of the vehicle body. The outer wall of each of the main frames 9 is coupled, at three points, with outriggers 12 each having a hat-like sectional shape and extending in a vehicle width. The outer ends of the outriggers 12 are coupled with side sills 13. Like the main frames 9, the outriggers 12 are coupled with the lower surface of the front floor 4. The fuel cell system box 5 is fixedly clamped to the lower walls 14 of the main frames 9 by bolts 15 and nuts 16. Thus, the fuel cell 3 is located inside the side sills 13 and between the left and right main frames 9. Incidentally, in FIG. 3, arrows of front and rear designate the longitudinal direction of the vehicle body, and arrows of left and right designate the lateral direction of the vehicle body.

The main frames 9 and the side sills 13 are communicated with left and right rear frames 17 (see FIG. 1) arranged in the longitudinal direction in the rear part of the vehicle body through the rear ends of the side sills 13. As seen from FIG. 1, sub-frames 18 equipped with rear suspensions (not shown) are attached to the rear frames 17 from beneath. The hydrogen tanks 19 and 20 are horizontally fixed on the front side and rear side of the sub-frames 18 and between the rear frames 17. Thus, the hydrogen tanks 19 and 20 are also arranged between the main frames 9.

As seen from FIGS. 1 and 2, a collision ECU 21 is arranged above the front of the fuel cell system box 5 within a dash board 33. The collision ECU 21 serves to control the ordinary behavior of a vehicle and also to operate a passenger protecting device and the fuel cell protecting device on the basis of an input signal of each of G sensors which will be described hereinafter. Incidentally, in order to control the behavior of the ordinary vehicle, a G sensor S1 is arranged in the vicinity of the collision ECU 21.

The collision ECU 21 is connected to not only the above G sensor S1 but also front G sensors S2 arranged on the left and right sides of the front of the vehicle body, side G sensors (first collision detecting sensors) S3 arranged on both sides of the fuel cell 3 and rear G sensors (second collision detecting sensors) S4 located on the sides of the hydrogen tanks 19 and 20, respectively.

At the time of collision in the front of the vehicle, on the basis of the deceleration and acceleration, the front G sensors S2 are served to extend air bag device 36 located at a steering handle 34 on a driver side and air bag device 36' located in an instrument panel 35 in front of a passenger side on the front seat (front row) 28. The front G sensors S2 supply an ignition signal to each of the air bag devices 36 and 36'. Incidentally, the ignition signal can also be supplied to a pretensioner of a seatbelt device, which is not shown.

When the collision ECU 21 is supplied with a collision signal from each of the G sensors S1 to S4, it produces a cut-off signal cutting off the high voltage system in an output system of the fuel cell 3 and cuts off the supply of the hydrogen gas. More specifically, the high voltage system is cut off by giving a cut-off signal to the contactor 27 and capacitor contactor 32 arranged between the fuel cell 3 and the motor 2, whereas the hydrogen system is cut off by giving a cut-off signal to the cut-off valve 22 arranged between the hydrogen tanks 19, 20 and the fuel cell 3.

Meanwhile, the side G sensors G3 arranged on the sides of the fuel cell 3 are arranged at the positions corresponding to the sides of the driver and passenger on the front seat 28. Specifically, as seen from FIG. 4, brackets 38 each having an L sectional shape are attached to sloping areas on both sides of the front floor 4. And the side G sensors S3 are attached to sideward facing planes of the brackets 38, respectively.

The rear G sensors S4 arranged on the sides of the hydrogen tanks 19 and 20 are arranged at the positions corresponding to the sides of the passengers on the rear seat 29. Specifically, like the above side G sensors S3 attached to the front floor 4, the rear G sensors S4 are attached to the rear floor 6 so as to face sideward through the brackets (not shown).

Namely, the side G sensors S3 and the rear G sensors S4 serve as triggers for protecting the pressurized hydrogen of the fuel cell 3 and the generated output of the fuel cell 3 as described above, and also serve as triggers for protecting the passengers on the front seat 28 and rear seat 29, concretely for expanding side air bag devices 37 (passenger protecting devices) housed in e.g. a seat back 28B of the front seat 28 and a seat back 29B of the rear seat 29 for the passengers on the front and rear seats. Incidentally, side air curtains may be substituted for the side air bag devices 37.

In this case, the positions corresponding to the sides of the passengers seating on the front seat 28 where the side G sensors G3 are arranged substantially corresponds to the expanding range of the side air bag devices 37 arranged on the seat back 28B of the front seat 28 (width D1 in FIG. 1). The positions corresponding to the sides of the passengers seating on the rear seat 29 where the rear G sensors G4 are arranged substantially corresponds to the expanding range of the rear air bag devices 37 arranged on the seat back 29B of the rear seat 29 (width D2 in FIG. 1).

Further, the side G sensors S3 and rear G sensors S4 serve as the triggers for protecting the output system of the fuel cell 3 and the hydrogen system of the fuel cell 3 and for protecting the passengers. The threshold value for the side air bag devices 37 (reference value of shock acceleration at which ignition of squib is started) is set at a lower value than that for the cut-off valve 22 and the contactors 27 and 32. Namely, in order to give priority to the protection of the passengers, before the side air bag devices 37 are expanded, the cut-off operations of the cut-off valve 22 for protecting the hydrogen system of the fuel cell 3 and contactors 27 and 32 for protecting the output systems of the fuel cell 3 will not be performed.

In accordance with the embodiment described above, the side air bags 37 are operated based on the detection results of the side G sensors S3 and rear G sensors S4 in order to protect the passengers. In addition, the cut-off valve 22 for cutting off the hydrogen gas and contactors 27 and 32 for cutting off the output from the fuel cell 3 are operated based on the detection results of the side G sensors S3 and rear G sensors S4 in order to protect the fuel cell 3. Thus, the hydrogen tanks 19 and 20, fuel cell 3 and passengers can be protected from collision.

Namely, at the time of vehicle collision, the passengers can be protected by the side air bag devices 37, and by using the same G sensors S3, S4, the hydrogen required for reaction and the generated output can be surely cut off. Thus, the hydrogen system and the output system of the fuel cell can be surely protected.

Further, the side G sensors S3 and rear G sensors S4 provided for protecting these fuel cell 3 and hydrogen tanks 19 and 20 can be effectively employed to expand the side air bag devices 37 for protecting the passengers so that a minimum number of G sensors can be arranged at optimum positions within a limited space, thereby reducing the production cost.

Although the side G sensors S3 and rear G sensors S4 serve as the triggers for protecting the output system of the fuel cell 3 and the hydrogen system of the fuel cell 3 and for protecting the passengers, the threshold value for the side air bag devices 37 and that for the contactors 27 and 32 are set at different values so that the optimum detecting accuracy corresponding to each protecting operation can be assured. This provides the same detecting performance as in the case where the G sensors are independently provided for protecting the passengers and the fuel cell 3.

Particularly, the threshold value for the side air bag devices 37 is set at a lower value than that for the cut-off valve 22, fuel cell contactor 27 and capacitor contactor 32. In this case, before the side air bag devices 37 for protecting the passengers are expanded, the cut-off operation of the cut-off valve 22 for protecting the hydrogen system and contactors 27 and 32 for protecting the output system of the fuel cell 3 will not be performed. Thus, while the G sensors are employed for protecting the fuel cell 3, the same collision safety performance for the passengers as for the ordinary vehicle can be precedently obtained. For example, even when the collision occurs at the G sensor output which is higher than the threshold value for the passenger protecting device and lower than that for the fuel cell protecting device, the protection for the passengers can be precedently performed. At this time, the cut-off operation of the contactor 27 for the fuel cell 3 and the contactor 32 for the capacitor 31 is not performed so that the fuel cell vehicle 1 can be moved after the collision.

Incidentally, the threshold values for expanding the side air bag devices 37 for the front seat 28 and rear seat 29 can be set at different values for the respective seats.

By arranging the fuel cell 3 and hydrogen tanks 19 and 20 inside the side sills 13 and between the left and right main frames 9, the fuel cell 3 and hydrogen tanks 19 and 20 can be protected from the collision at the side of the vehicle by the main frames 9. Therefore, such an arrangement is preferable from the standpoint of protecting the important components.

Additionally, this invention should not be limited to the preferred embodiment described above. For example, although the explanation has been given of the case when the side collision is detected by the side G sensors S3 and rear G sensors S4, both the pressurized hydrogen supplied from the hydrogen tanks 19 and 20 and the generated output system for the fuel cell 3 are cut off by the cut-off valve 22 and contactors 27 and 32, at least either of the pressurized hydrogen or the generated output system of the fuel cell 3 may be cut off. In such a manner, it will be obvious to those skilled in the art that various changes and modification may be made therein without departing from the present invention, and it is aimed therefore, to cover in the appended claim all such changes and modifications as fall within the true spirit and scope of the present invention.

What is claimed is:

1. A fuel cell vehicle comprising:
   a fuel cell for generating electric power through electrochemical reaction of hydrogen and oxygen;
   a hydrogen tank for storing pressurized hydrogen to supply hydrogen to the fuel cell;
   a first collision detecting sensor arranged on the side of the fuel cell, the first collision detecting sensor being located at a position corresponding to the side of a passenger in a front row;
   a second collision detecting sensor arranged on the side of the hydrogen tank, the second collision detecting sensor being located at a position corresponding to the side of a passenger in a rear row; and
   a protecting device for performing a predetermined protection operation in accordance with the detection results of the first collision detecting sensor and the second collision detecting sensor, the protecting device including a passenger protecting device for protecting the passenger, and a fuel cell protecting device for protecting the fuel cell.

2. The fuel cell vehicle according to claim 1, wherein the first and the second collision detecting sensors are given different threshold values according to the respective protecting devices.

3. The fuel cell vehicle according to claim 1, wherein the threshold value set for the passenger protecting device is lower than the threshold value set for the fuel cell protecting device.

4. The fuel cell vehicle according to claim 3, further comprising a control unit receiving a collision detection value, the control unit being programmed to:
  activate the passenger protecting device if the collision detection value is higher than the threshold value set for the passenger protecting device but lower than the threshold value set for the fuel cell protecting device; and
  activate the passenger protecting device and the fuel cell protecting device if the collision detection value is higher than the threshold value set for the passenger protecting device and the threshold value set for the fuel cell protecting device.

5. The fuel cell vehicle according to claim 1, wherein the fuel cell protecting device cuts off at least one of the pressurized hydrogen supplied from the hydrogen tank and the output of the electric power generated by the fuel cell.

6. The fuel cell vehicle according to claim 1, further comprising:
  an accumulating device for accumulating at least one of the electric power generated by the fuel cell and regenerative electric power generated by a drive motor driving the fuel cell vehicle,
  wherein the fuel cell protecting device cuts off electric output from the accumulating device.

7. The fuel cell vehicle according to claim 1, wherein the fuel cell and the hydrogen tank are disposed between left and right main frames which are extended in a longitudinal direction of the vehicle on a inner side of sills.

8. The fuel cell vehicle according to claim 1, wherein the first collision sensor faces a lateral direction of the vehicle and detects a side collision against the fuel cell, and the second collision sensor faces the lateral direction of the vehicle and detects a side collision against the hydrogen tank.

9. The fuel cell vehicle according to claim 1, wherein
  the protecting device gives priority to an operation of a passenger protecting operation over a protection operation of the fuel cell protecting device.

* * * * *